United States Patent
Fuentes

(10) Patent No.: US 6,669,922 B1
(45) Date of Patent: Dec. 30, 2003

(54) INSTALLATION FOR THE PRODUCTION OF PURE HYDROGEN FROM A GAS CONTAINING HELIUM

(75) Inventor: François Fuentes, Le Vesinet (FR)

(73) Assignee: L'Air Liquide - Societe Anonyme a Directoire et Conseil de Surveillance Pour l'Etude et l'Exploitation des Procedes Georges Claude, Paris Cedex (FR)

( * ) Notice: Subject to any disclaimer, the term of this patent is extended or adjusted under 35 U.S.C. 154(b) by 109 days.

(21) Appl. No.: 09/707,996

(22) Filed: Nov. 8, 2000

(30) Foreign Application Priority Data

Nov. 8, 1999 (FR) .............................. 99 13987

(51) Int. Cl.$^7$ ................................ C01B 3/02
(52) U.S. Cl. .............................. 423/648.1; 95/4; 95/53; 422/169; 422/189
(58) Field of Search ............................ 423/648.1, 650; 422/169, 189; 95/53; 96/4

(56) References Cited

U.S. PATENT DOCUMENTS 5,447,559 A * 9/1995 Rao et al. ........................ 96/4
5,837,032 A 11/1998 McReynolds et al. ......... 95/45

FOREIGN PATENT DOCUMENTS

| DE | 3421833 | 12/1985 | .......... B01D/13/04 |
| DE | 297 09 266 | 10/1997 | .......... B01D/53/00 |
| EP | 0 742 172 | 11/1996 | ............. C01B/3/38 |

OTHER PUBLICATIONS

K.P. Tzevelekos et al., "Experimental investigation on separations of condensable from non–condensable vapors using mesoporous membranes", Elsevier Science Publishing, vol. 31, No. 1–2, Oct. 1999, pp. 151–162.

* cited by examiner

Primary Examiner—Stanley S. Silverman
Assistant Examiner—Maribel Medina
(74) Attorney, Agent, or Firm—Young & Thompson

(57) ABSTRACT

The feed gas contains essentially hydrocarbons, particularly methane, and impurities including helium. The process includes the conversion of the hydrocarbons into hydrogen and $CO_2$, and the purification by adsorption of the hydrogen contained in the resulting gaseous mixture. Prior to the conversion of the hydrocarbons, the feed gas is processed in a unit for separation by permeation producing a retentate gas impoverished in helium, containing essentially hydrocarbons, and a permeate gas enriched in helium, the retentate gas being then treated by the conversion of the hydrocarbons, particularly of the methane.

20 Claims, 1 Drawing Sheet

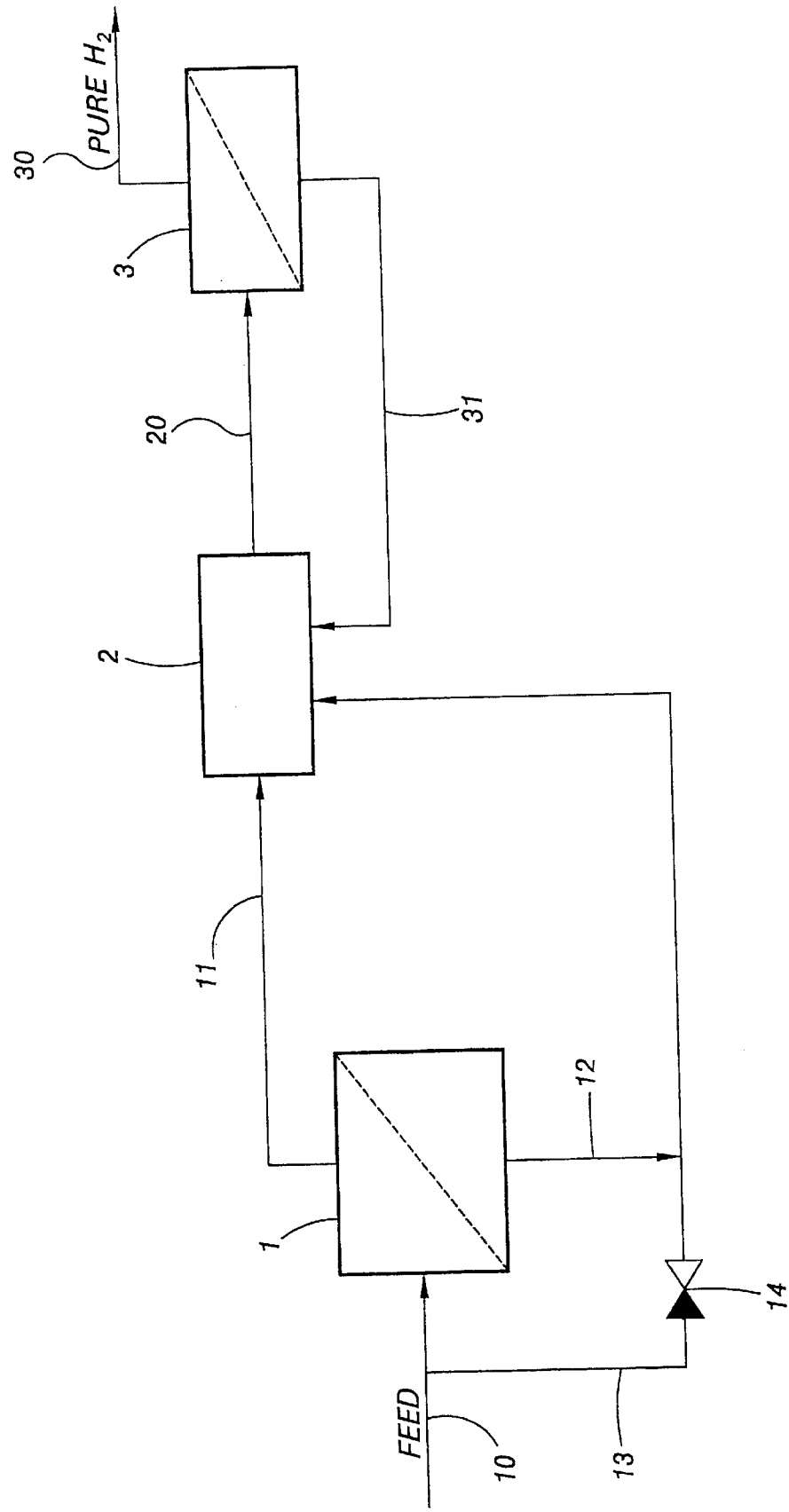

INSTALLATION FOR THE PRODUCTION OF PURE HYDROGEN FROM A GAS CONTAINING HELIUM

FIELD OF THE INVENTION

The present invention relates to a process for the production of pure hydrogen from a gas such as natural gas, containing helium. It relates more specifically to a process permitting producing hydrogen of satisfactory purity for use in electronic sector.

It also relates to an installation for the practice of this process.

BACKGROUND OF THE INVENTION

Among the various known processes in this field, one of the conventional methods to produce hydrogen of high purity consists in carrying out a steam reforming of hydrocarbons followed by a catalytic conversion with steam, of the carbon monoxide present in the gaseous mixture obtained. The resulting synthesis gas is then purified in a PSA (Pressure Swing Adsorption) unit.

The source of these hydrocarbons is generally a natural gas network which contains methane and other heavy hydrocarbons but also sulfur compounds, nitrogen, carbon dioxide and helium.

Most of these impurities can be eliminated in the course of the production and purification process for hydrogen, except helium, which is an inert chemical compound. The latter is generally present in an amount of 100 to 1000 ppm and has a low adsorptive power, such that this element is found almost necessarily in the produced purified hydrogen.

This impurity is not generally troublesome in most uses of hydrogen purified by this type of process.

However, in the electronic field, it is necessary to have very high purity hydrogen and it thus becomes desirable to produce hydrogen containing no helium.

At present, to produce hydrogen free from helium, there is generally used a primary material not containing this impurity. There can thus be provided a steam reforming process as mentioned, from naphtha or methanol. These however are semi-finished products and the cost of this primary material is fairly high. Another route is the production of hydrogen by electrolysis of water. However this requires high energy and is used essentially for small scale production of purified hydrogen.

From the point of view of the separation of the helium contained in hydrogen, the means available in the art are limited either to liquefaction of the natural gas by cryogenic processing, or the use of metallic membranes such as palladium membranes downstream of a PSA unit, the use of such membranes supposing the availability of a product that has already preliminarily been purified. As a result, the separation of helium present in hydrogen remains very difficult and costly until now.

SUMMARY OF THE INVENTION

The object of the present invention is to provide a process permitting producing very high purity hydrogen, in particular containing no helium.

Another object of the present invention is to provide such a process using a gas which contains helium, as a starting material, in particular natural gas.

Another object of the invention is again to provide such a process that will be relatively simple and inexpensive.

The object of the present invention is also to provide an installation for practicing such a process.

These objectives as well as others which will become apparent in the light of the description which follows, are achieved by means of a process for the production of high purity hydrogen, substantially free from helium, from a feed gas containing essentially hydrocarbons, particularly methane, and impurities including helium, of the type comprising the conversion of the hydrocarbons, particularly the methane, into hydrogen and carbon dioxide, and the purification in a PSA unit of the hydrogen contained in the resulting gaseous mixture, characterized in that, prior to conversion of the hydrocarbons, particularly methane, the feed gas is processed in a unit for separation by permeation, producing a retentate gas impoverished in helium, containing essentially hydrocarbons, particularly methane, and a permeate gas enriched in helium, said retentate gas being then processed in said hydrocarbon conversion unit, particularly as to methane, by producing a gaseous mixture practically free from helium, containing hydrogen.

According to other characteristics of the invention:
the feed gas is a natural gas containing helium, particularly between 100 and 1000 ppm helium;
the conversion of the hydrocarbons, particularly the methane, contained in the retentate gas impoverished in helium, is carried out by steam reforming, then catalytic conversion with steam of the carbon monoxide product into carbon dioxide;
a portion of the feed gas is used as an energy source for the burners producing the heat necessary for the steam reforming operation;
the residual low pressure gaseous permeate from the unit of separation by permeation is used as an energy source for the burners producing the heat necessary for the steam reforming operation;
the residual gas from the PSA purification unit is used as a source of energy for the burners producing the heat necessary for the steam reforming operation;
the conversion of the hydrocarbons, particularly the methane, contained in the retentate gas impoverished in helium, is carried out by partial oxidation;
the low pressure residual permeate gas from the unit of separation by permeation and/or the residual gas from the PSA unit, are used as energy source to produce the steam in an auxiliary heater.

The invention also has for its object an installation for the production of high purity hydrogen, substantially free from helium, from a feed gas containing hydrocarbons, particularly methane and impurities including helium, of the type comprising a unit comprising conversion means for the hydrocarbons, particularly the methane, into hydrogen and carbon dioxide, and a unit for purification by modulated pressure adsorption or PSA, of the hydrogen contained in the resulting gaseous mixture, characterized in that it moreover comprises, upstream of said hydrocarbon conversion means, particularly the methane, a unit for separation by permeation, means for supplying feed gas to said permeation unit, and means for supplying retentate gas produced in the unit for separation by permeation, to said hydrocarbon conversion means, particularly for the methane.

BRIEF DESCRIPTION OF THE DRAWINGS

An example of the process according to the invention will now be described in detail with reference to the accompanying drawing, in which is schematically shown an installation according to the invention.

DETAILED DESCRIPTION OF THE INVENTION

The feed gas used in the process according to the invention is generally natural gas whose helium content is comprised between 100 and 1000 ppm.

The feed gas 10 is brought to the permeation unit 1. In this unit, there is used any type of membrane permitting essentially the separation of helium from the other constituents present in the feed gas 10, principally the hydrocarbons, and in particular the methane.

The separation in unit 1 is carried out preferably at a temperature comprised between 30 and 90° C.

At the outlet of unit 1, there is obtained a gaseous mixture 11, called the retentate gas, impoverished in helium and containing essentially hydrocarbons, particularly methane, and other impurities from the feed gas. There is also produced a permeate gas 12 at low pressure, rich in helium.

The retentate gas 11 is then processed in a unit 2 for the conversion of hydrocarbons, particularly methane, to produce hydrogen and carbon monoxide, which is then catalytically converted into carbon dioxide, with the help of steam. The unit 2 comprises essentially a first reactor, a so-called steam reformer, followed by at least one second reactor for the catalytic conversion of the carbon monoxide.

At the outlet of unit 2, there is thus obtained a gaseous mixture 20 containing essentially hydrogen, carbon dioxide, residual carbon monoxide, as well as a residual impurities present in the feed gas 10. The gaseous mixture 20 is practically free from helium.

The stream 20 of impure hydrogen is then processed in a PSA unit 3 under the conventional conditions used. There is obtained a flow 30 of hydrogen of high purity, containing practically no helium.

As to the heat balance of the process according to the invention, a portion 13 of the feed gas 10 can be used, after expansion in an expansion valve 14, as an energy source for the burners producing the heat necessary for the reforming operation, which is endothermic, carried out in unit 2. The permeate gas 12 produced at low pressure in the separation unit 1 can be used, conjointly with the flow 13, for this purpose. The residual gas 31 from the final PSA unit 3 can also serve as an energy source for the burners permitting reforming the hydrocarbons in the unit 2.

As a modification, the conversion of the hydrocarbons can be carried out by other processes, particularly by partial oxidation in unit 2, the residual flows 12 and 31 mentioned above can thus be used as the energy source for a production of steam in an auxiliary heater (not shown).

The process according to the invention thus has the advantage of permitting the separation of helium during the production of hydrogen without modifying the overall heat balance of said production of hydrogen but by using the energy of the system to eliminate the helium present in the feed gas for this production.

The process according to the invention permits producing hydrogen of a purity of the order of 99.99% whilst according to the known technique, the purity of the hydrogen produced could not exceed 99.9%.

An example of the separation of helium in the unit 1 is given hereafter by way of illustration and not limitation:

EXAMPLE

|  | NATURAL GAS (10) | Retentate (11) | Permeate (12) |
|---|---|---|---|
| PRESSURE bars absolute | 35 | 34 | 1.3 |
| TEMPERATURE ° C. | 35 | 70 | 70 |
| FLOW RATE Nm³/h | 5000 | 4190 | 810 |
| COMPOSITION mol. |  |  |  |
| He | 0.0005 | 0.000039 | 0.00289 |
| $N_2$ | 0.01 | 0.0096 | 0.01206 |
| $CH_4$ | 0.9537 | 0.9518 | 0.96353 |
| $C_2H_6$ | 0.03 | 0.03289 | 0.01505 |
| $C_3H_8$ | 0.003 | 0.00337 | 0.00107 |
| i.C4 | 0.0006 | 0.00068 | 0.0002 |
| n.C4 | 0.0006 | 0.00068 | 0.0002 |
| n.C5 | 0.0006 | 0.00068 | 0.00018 |
| $CO_2$ | 0.001 | 0.00026 | 0.00483 |

The helium is eliminated to an extent of 93.5%.

What is claimed is:

1. A process for the production of hydrogen of high-purity, substantially free from helium, from a feed gas containing essentially hydrocarbons and impurities including helium, comprising the following steps:
    supplying said feed gas to a permeation unit so as to obtain a permeate gas rich in helium and a retentate gas impoverished in helium and enriched in hydrocarbons;
    supplying said retentate gas to a conversion unit to convert the hydrocarbons into a converted gas containing hydrogen and carbon dioxide; and
    supplying said converted gas to an adsorption unit to produce pure hydrogen substantially free from helium as product gas.

2. The process according to claim 1, wherein the feed gas is natural gas containing between 100 and 1000 ppm of helium.

3. The process according to claim 1, wherein the conversion of the hydrocarbons contained in the retentate gas impoverished in helium is effected by steam reforming to generate carbon monoxide and then catalytic conversion of the carbon monoxide with steam into carbon dioxide.

4. The process according to claim 3, further comprising using a portion of the feed gas as an energy source for carrying out the steam reforming.

5. The process according to claim 4, further comprising using a residual gas from the adsorption unit as an energy source for carrying out the conversion of the hydrocarbons.

6. The process according to claim 3, further comprising using the helium-rich permeate gas from the permeation unit as an energy source for carrying out the steam reforming.

7. The process according to claim 1, wherein the conversion of the hydrocarbons contained in the retentate gas impoverished in helium is carried out by partial oxidation.

8. An installation for the production of high-purity hydrogen substantially free from helium from a feed gas containing essentially hydrocarbons and at least 100 ppm of helium, comprising:
    a permeation unit having an inlet connectable to a source of said feed gas, a retentate outlet for discharging a helium-impoverished and hydrocarbon-enriched retentate gas and a permeate outlet for discharging a helium rich permeate gas;
    a conversion unit having a supply inlet connected to said retentate outlet of said permeation unit, a converted gas outlet, and at least one fuel inlet; and an adsorption unit having a supply inlet, a residual gas outlet and a product gas outlet for supplying said high-purity hydrogen.

9. The installation according to claim 8, wherein said residual gas outlet of said adsorption unit is connected to said fuel inlet of said conversion unit.

10. The installation according to claim 8, wherein said permeate outlet of said permeation unit is connected to said fuel inlet of said conversion unit.

11. The installation according to claim 8, wherein said conversion unit includes a steam reforming unit.

12. The installation according to claim 8, wherein said conversion unit includes a partial oxidation unit.

13. A pure hydrogen gas production installation, comprising:

a gas feed providing feed gas with a helium content;

a permeation unit having an inlet connected to the gas feed gas, a retentate outlet for discharging a helium-impoverished and hydrocarbon-enriched retentate gas and a permeate outlet for discharging a helium rich permeate gas;

a conversion unit, for converting hydrocarbons to hydrogen and carbon dioxide, having a supply inlet connected to the retentate outlet, the conversion unit comprising a steam reformer reactor, the steam reformer reactor discharging into a catalytic conversion reactor with a converted gas outlet for discharging an impure hydrogen gaseous mixture consisting essentially of hydrogen, carbon dioxide, residual carbon monoxide, and residual impurities of the feed gas, the gaseous mixture being essentially free from helium; and an adsorption unit having a supply inlet connected to the converted gas outlet of the catalytic conversion reactor, a residual gas outlet and a product gas outlet for supplying high-purity hydrogen of about 99.99% pure.

14. The installation of claim 13, wherein the membrane is exposed to a temperature between 30 and 90° C.

15. The installation of claim 13, wherein, the conversion unit further comprises a energy source input connected to burners, the energy source input is connected to the gas feed via an expansion valve, and the energy source input receiving, from the expansion valve, a supply of the feed gas for feeding the burners.

16. The installation of claim 15, wherein, the energy source input is further connected to the permeate outlet downstream of the expansion valve so that the energy source input receives a supply comprising the feed gas and the helium rich permeate gas for feeding the burners.

17. The installation of claim 15, wherein, the conversion unit further comprises a residual gas energy source input connected to the burners, and the residual gas energy source input is connected to the residual gas outlet.

18. The installation of claim 13, wherein the feed gas is natural gas containing between 100 and 1000 ppm of helium.

19. The installation of claim 13, wherein the helium content of the feed gas is at least 100 ppm.

20. The installation of claim 13, wherein the permeation unit comprises a membrane for separating helium from the feed gas.

* * * * *